(No Model.)

J. SCOTT & F. G. AVERS.
CASTER.

No. 257,834. Patented May 9, 1882.

Witnesses:
J. W. Garner
H. S. D. Haines

Inventors,
John Scott,
Frank G. Avers,
Howard A. Snow,
attorney.

UNITED STATES PATENT OFFICE.

JOHN SCOTT AND FRANK G. AVERS, OF CHICAGO, ILLINOIS, ASSIGNORS OF ONE-THIRD TO HERBERT M. AVERS, OF SAME PLACE.

CASTER.

SPECIFICATION forming part of Letters Patent No. 257,834, dated May 9, 1882.

Application filed June 7, 1881. (No model.)

*To all whom it may concern:*

Be it known that we, JOHN SCOTT and FRANK G. AVERS, citizens of the United States of America, residing at Chicago, in the county of Cook and State of Illinois, have invented certain new and useful Improvements in Casters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to furniture-casters; and it consists in the construction and arrangement of its several parts, as will be hereinafter fully set forth, and pointed out in the claims.

Figure 1:
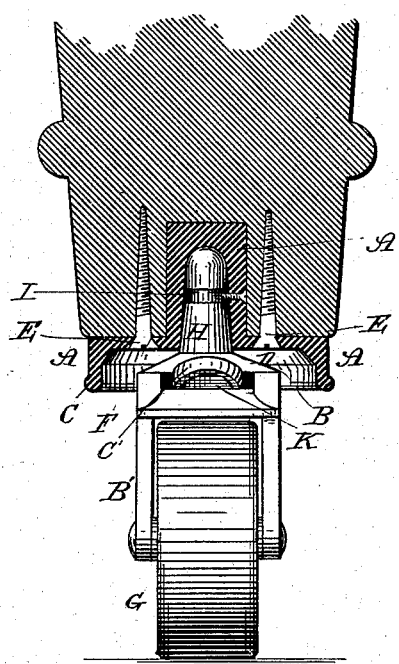
Figure 2:
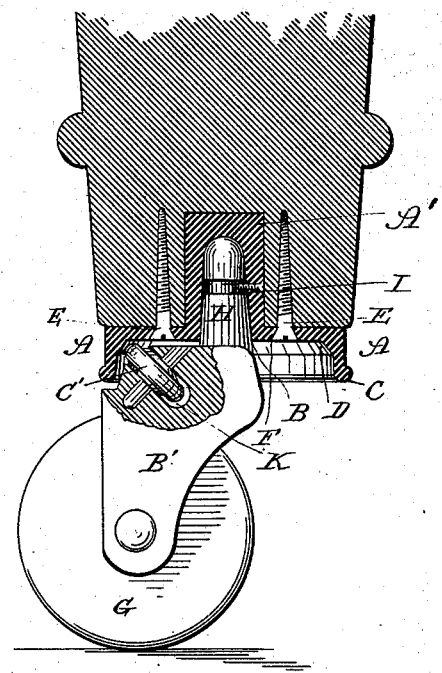
Figure 3:
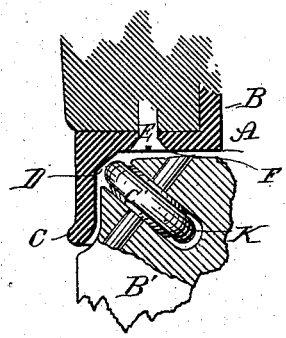

Figure 1 is a sectional view of the leg, showing a front view of the caster attached thereto. Fig. 2 is a side view with the wall of the caster broken away to show the anti-friction wheel. Fig. 3 is a detail view enlarged, showing the anti-friction wheel and bearing.

The letter A represents a metallic plate cast of any desirable size to suit its appliance to the leg of a table or other piece of furniture, and is formed with the central elevation, A', and hole B for receiving the vertical pivot of the caster. This plate is also formed with the downward-extending flange C, made with a beveled base, D, against which the face of the anti-friction wheel bears. This flanged plate is screwed in place, as shown at E, and has the screw-hole F for the purpose of placing a screw the end of which extends through the wall into the groove or notch cut around the vertical pivot of the caster.

The letter B' represents the caster-frame, (carrying the ordinary main wheel, G,) formed with the vertical pivot H, having the notch or groove I extending around it. The vertical pivot corresponds with the chamber in the plate, and the frame at its base extends at right angles to its axis, and is provided with the oblique slot K and journal-hole and socket at right angles to the slot, and in this slot fits the anti-friction wheel C', so adjusted at an angle that its face bears on the beveled base of the wall of the plate on the leg, so that the caster revolves on its vertical pivot. The adjustment of the parts in place is plainly shown in the drawings, and from this the operation will be fully understood by those skilled in the art; but it will be observed that the small screw which extends through the wall of the vertical extension of the plate into the vertical pivot of the caster serves to maintain it (the caster) in place should the body which it bears be lifted from the surface, and also that the oblique anti-friction wheel is so adjusted as to bring the weight of the body supported on its rim and directly over the axle of the caster-wheel, keeping the surface of the plate and the face from contact.

It will be seen by reference to the drawings that the case A, with the downward flange C, overhangs the upper portion of the caster-frame and protects the anti-friction wheel C' and bearings from dust, &c., and at the same time the flange C prevents any wabbling of the caster in its rotary motion.

What we claim as our invention, and desire to secure by Letters Patent, is—

1. In a caster, the combination of the case A, provided with recess I, and having beveled surface D and downward-extending flange C, with the caster-frame B, with a pivot, H, and having an oblique slot, K, adapted to receive the anti-friction wheel C', all arranged and operating as set forth.

2. The improved caster hereinbefore described, consisting of the frame B, with the side cheek-pieces, B', between which is journaled and revolves the wheel G, and formed with the oblique slot K, in which is journaled diagonally the anti-friction wheel C', and provided with the pivot or shank H, formed with the groove, and the flanged casing A, formed with the central elevation, as shown and set forth.

In testimony whereof we affix our signatures in presence of two witnesses.

JOHN SCOTT.
FRANK G. AVERS.

Witnesses:
WILLIAM G. MILLER,
JNO. W. WILLIAMSON.